(12) United States Patent
Tezak et al.

(10) Patent No.: US 8,640,348 B2
(45) Date of Patent: Feb. 4, 2014

(54) SYSTEM FOR SENSING THE POSITION OF A MOVABLE BAR

(75) Inventors: Robert J. Tezak, Carol Stream, IL (US); James E. Brown, Naperville, IL (US); Robert C. Signaigo, Lemont, IL (US)

(73) Assignee: Control Solutions LLC, Aurora, IL (US)

( * ) Notice: Subject to any disclaimer, the term of this patent is extended or adjusted under 35 U.S.C. 154(b) by 1049 days.

(21) Appl. No.: 12/638,789

(22) Filed: Dec. 15, 2009

(65) Prior Publication Data

US 2011/0144867 A1 Jun. 16, 2011

(51) Int. Cl.
*G01D 5/347* (2006.01)

(52) U.S. Cl.
USPC .............................................. 33/1 PT; 33/706

(58) Field of Classification Search
USPC ..... 33/1 PT, 1 N, 706, 708, DIG. 2, DIG. 15; 73/261; 701/49
See application file for complete search history.

(56) References Cited

U.S. PATENT DOCUMENTS

| | | | | |
|---|---|---|---|---|
| 5,986,559 A * | 11/1999 | Larson | | 33/1 PT |
| 6,305,737 B1 * | 10/2001 | Corder et al. | | 296/146.11 |
| 6,658,747 B2 * | 12/2003 | Kuru | | 33/1 PT |
| D622,131 S * | 8/2010 | Tezak et al. | | D8/349 |
| D623,044 S * | 9/2010 | Tezak et al. | | D8/349 |
| 8,157,277 B2 * | 4/2012 | Leitner et al. | | 280/166 |
| 8,225,458 B1 * | 7/2012 | Hoffberg | | 16/49 |
| 8,292,348 B2 * | 10/2012 | Villeminey | | 296/146.1 |
| 8,296,964 B2 * | 10/2012 | Siraky | | 33/706 |
| 2002/0178593 A1 * | 12/2002 | Kuru | | 33/1 PT |
| 2006/0125204 A1 * | 6/2006 | Leitner et al. | | 280/166 |
| 2011/0144867 A1 * | 6/2011 | Tezak et al. | | 33/1 PT |
| 2011/0204681 A1 * | 8/2011 | Villeminey | | 296/202 |

* cited by examiner

*Primary Examiner* — Yaritza Guadalupe-McCall
(74) *Attorney, Agent, or Firm* — McCracken & Frank LLC

(57) ABSTRACT

A system for sensing the position of a movable bar is provided. The system includes a rotatable body positioned for rotation about an axis. The rotatable body is mechanically coupled with the movable bar such that the rotatable body rotates about the axis as the movable bar moves. A sensor is mechanically coupled with the rotatable body such that the sensor senses the rotation of the rotatable body as the movable bar moves.

19 Claims, 10 Drawing Sheets

SYSTEM FOR SENSING THE POSITION OF A MOVABLE BAR

FIELD OF THE INVENTION

This invention generally relates to electro-mechanical sensory systems and more particularly to systems for sensing the position of a hydraulic cylinder in a vehicle door.

BACKGROUND

Industrial systems may include a variety of moving mechanical components. Often, it is useful to know the position of a certain component in the system. One example is a vehicle door, such as a vehicle door on a military or safety vehicle. Vehicle doors on certain military vehicles may include sophisticated technology such as a powered door assist system. A powered door assist system may be necessary to provide assistance when opening and closing the vehicle door if heavy, armored plates and other technology are added to the door. A powered door assist system may utilize a hydraulic cylinder to provide the necessary assistance when moving the door.

Further, it is often useful for an electronic controller installed in a military vehicle to know the position of a vehicle door. Based on the position of the vehicle door, the controller can take some action or refrain from taking some action. Conventional electro-mechanical-based systems may be employed to provide a controller information relating to the position of the vehicle door. It is important however that precise and accurate readings are made. Additionally, certain conventional systems may be bulky in design making them inapt for industrial applications where space is limited. Thus, there is a need for a system for determining the position of industrial components that gives accurate readings and is not spatially obtrusive.

SUMMARY

A system for sensing the position of a movable bar is provided. The system includes a rotatable body positioned for rotation about an axis. The rotatable body is mechanically coupled with the movable bar such that the rotatable body rotates about the axis as the movable bar moves. A sensor is mechanically coupled with the rotatable body such that the sensor senses the rotation of the rotatable body as the movable bar moves.

DETAILED DESCRIPTION

Figure 1:
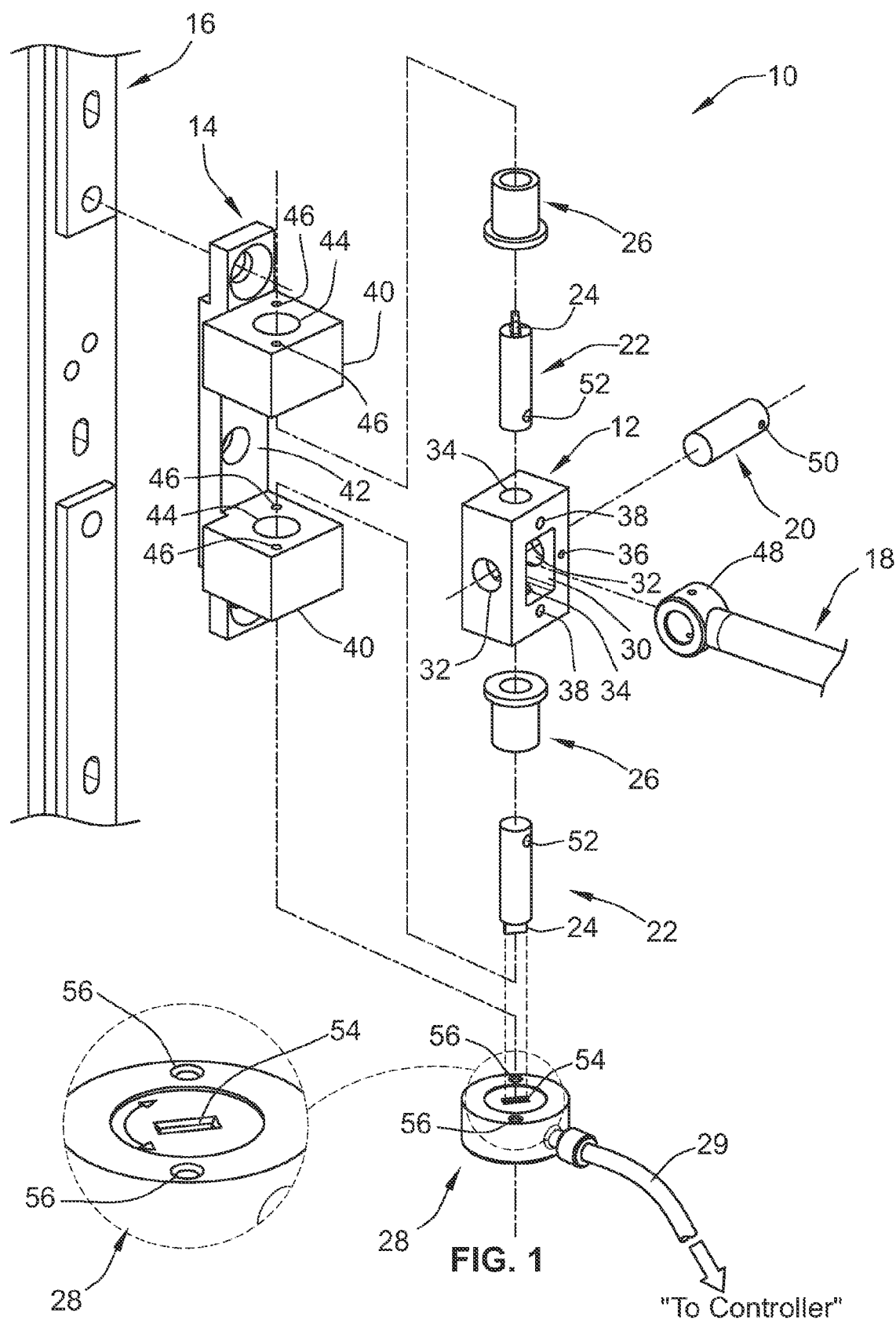
FIG. 1 is an exploded view of an example system for sensing the position of a movable bar.

A system for sensing the position of a moveable bar is described herein. In particular, the system enables a controller installed on a vehicle to determine the position of a vehicle door.

As shown herein, the system includes a rotatable body positioned for rotation about an axis. The rotatable body is attached to the movable bar such that the rotatable body rotates about the axis as the movable bar moves. A sensor is mechanically coupled to the rotatable body such that the sensor senses the rotation of the rotatable body as the movable bar moves. The movable bar, for example, may be a piston of a hydraulic cylinder used in connection with opening and closing a vehicle door.

The rotatable body may include a block with an open area and a securing piece positioned in the open area to secure the movable bar. For instance, the movable bar may include a looped portion through which the securing piece is inserted, and the securing piece may extend through the open area of the block to secure the movable bar in this open area.

Additionally, the system may include a pin attached to the rotatable body such that the pin rotates with the rotatable body as the movable bar moves. The pin may be a metal pin or any other type of pin suitable for attachment to and rotation with the rotatable body. The pin may further include a tab that engages a corresponding slot of the sensor, and the tab of the pin and the slot of the sensor may rotate with the rotatable body. As the rotatable body, pin, and slot rotate, the sensor may transmit a signal to a controller that relates to the rotation of the rotatable body and thus the position of the hydraulic cylinder piston, shaft, or any other type of movable bar.

As seen, a mounting bracket holds the rotatable body in an elevated position permitting rotational movement. The mounting bracket may be made of metal or any other material suitable for holding the rotatable body. The mounting bracket, for example, may be a clevis-shaped bracket with a pair of support members extending from its base. The rotatable body may be held between these support members so that the rotatable body is spaced apart from the base of the mounting bracket. Further, the mounting bracket may be secured to a frame that is attached within a vehicle cabin. The frame may similarly be made of metal or any other material suitable for attaching it to a vehicle cabin and securing the mounting bracket.

The clevis-shaped mounting bracket includes a pair of support members each having a bore that aligns with a corresponding bore at opposite side walls of the rotatable body. Aligning the bore of the support member and the bore of the rotatable body allows the pin to be inserted through the bore of the support member and the bore of the rotatable body. The pin may also include a hole that aligns with a corresponding hole of the rotatable body. This alignment allows the tab of the pin to be set at a pre-determined position, for example, at an initial angle of rotation.

As seen herein, a pair of pins may be respectively positioned through each of the bores of the support members of the clevis-shaped mounting bracket and also inserted through the corresponding bores of the rotatable body. This example configuration allows a sensor to interact with a rotatable pin at either end of the mounting bracket.

As noted herein, the movable bar may be, for example, the piston of a hydraulic cylinder. The actuation of the hydraulic cylinder may move the piston and thus rotate the rotatable body. Furthermore, the hydraulic cylinder may be installed within a vehicle door such that the movement of the vehicle door moves the piston and rotates the rotatable body. The pin may be held by a bearing within the support arm of the mounting bracket and in a bore of the rotatable body. The pin also rotates along the same axis of rotation with the tab of the pin rotating as it is engaged with the corresponding slot of the sensor. The sensor, in turn, sends an electrical signal to the controller such that the electrical signal relates to the rotation of the rotatable body and thus the position of the vehicle door.

Referring now to FIG. 1, a system 10 for sensing the position of a movable bar is shown in an exploded view. In this example, system 10 includes a rotatable body 12, a mounting bracket 14, a frame 16 to which the mounting bracket may be secured, a movable bar 18, a securing piece 20, a pair of pins 22 each having a tab 24, a pair of bearings 26, a sensor 28, and a cable 29 coupled with the sensor.

The rotatable body 12 in this example is shown as a block having an open area 30, bores 32, 34 through each of its side walls, and holes 36, 38 for respectively securing the securing piece 20 and the pair of pins 22. The mounting bracket 14 includes a pair of support members 40 extending from a base 42. Each support member 40 has a bore 44 through which a pin 22 may be inserted. Additionally, each support member 40 may include a pair of holes 46 used to secure the sensor 28. The base 42 of the mounting bracket 14 allows it to be secured to the frame 16. The frame 16 is adapted to receive and secure the mounting bracket 14. Furthermore, the frame 16 is configured such that it may be secured within a vehicle cabin adjacent to a vehicle door.

A movable bar 18 is shown having a looped end 48 that may be inserted into the open area 30 of the block 12. The securing piece 20, in this example, is shown as a pin, which may be inserted through the bores 32 of the side walls of the block 12 and through the looped end 48 to secure the movable bar 18 in the open area 30 of the block. The pin 20 may also include a hole 50 that may be aligned with hole 36 in the block 12. This hole 50 may receive a shaft, key, or the like to secure the pin 20 in the open area 30 of the block 12. This configuration accommodates vertical movement of the movable bar 18 while still allowing the movable bar to rotate from side to side.

A pair of bearings 26 may be respectively inserted into the bore 44 of each support member 40 of the mounting bracket 14. These bearings 26 facilitate the rotational movement of the pins 22 inserted through the bores 44 of the support members 40. Each pin 22 includes a tab 24, and each pin is respectively inserted through the bores 44 of the support members 40 and into the bores 34 of the block 12. Further, each tab 24, in this example, is configured to fit into the corresponding slot 54 of the sensor 28.

Each pin 22 also includes a hole 52 that may be respectively aligned with a hole 38 in the block 12. The holes 52 of the pins 22 may receive a shaft, key, or the like to secure each pin in the respective bore 34 of the block 12. Secured to the block 12, the pins 22, and the tab 24 of each pin, will rotate with the block. The holes 52 in the pins 22 also allow the tab 24 of each pin to be set at an initial position. For example, the holes of the pins may be positioned such that when the tab of a pin is inserted into the slot of the sensor 28, the slot has an initial rotation of 5 degrees.

The sensor 28 has a slot 54, which may be inserted onto a pin 22 such that the slot of the sensor rotates with the pin as the pin rotates with the block 12. For example, the sensor 54 may be a hall-effect flux sensor and may generate a signal that relates to the rotation of the block 12 and thus the position of the movable bar 18. In this example, the sensor 28 transmits a signal to a controller as the rotatable block 12 and pin 22 rotate with the signal being proportional to the position of the movable bar 18. For instance, the sensor may be an ILAPS Intrinsically Linear Angular Position Sensor, Model No. AN101101 from The Cherry Corporation of Waukegan, Ill.; however any suitable sensor capable of providing signals in response to rotational movement may selectively be employed.

Further, the sensor 28 may also include a pair of holes 56 alignable with the holes 46 of a support member 40 of the mounting bracket 14. A screw, pin, bolt, rivet, or the like may be used to secure the sensor 54 to the support member 40. To minimize the size of the support member 40, the holes 46 may be positioned on the diagonal of the support member. This configuration limits the size of the support member 40 to the width of the sensor 28. A cable 29 coupled with the sensor may be used to transmit the electrical signal generated by the sensor 28. The cable 29 may also be attached to a controller so that the controller may receive the electrical signal generated by the sensor 28.

Still referring to FIG. 1, the rotational movement of the block 12 and pins 22 as the movable bar 18 moves is described below. As the movable bar 18 moves to the right, in this example, the block 12 will also rotate about its axis in a counter-clockwise direction. As the block 12 rotates in this fashion, the pins 22 will rotate about the same axis with the block. The counter-clockwise rotation of the pins 22 rotates the tabs 24 of the pins about the same axis. If a tab 24 is inserted into the slot 54 of the sensor 28, the slot will rotate about the same axis as well. As seen, the sensor 28, in this example, is positioned for alignment along the same axis of rotation that the block 12 and the pins 22 rotate about. Based on the position of the slot 54, the sensor 28 generates an electrical signal relating to the rotation of the block 12, which corresponds with the position of the movable bar 18. A cable 29 attached to the sensor 28 and a controller, may transmit the signal generated by the sensor to the controller. A controller receiving this electrical signal can then interpret the signal as the position of the movable bar 18 thus making the controller aware of position of the movable bar.

A similar sequence occurs when the movable bar 18 moves to the left in the example of FIG. 1. As the bar 18 moves to the left, the block 12 will rotate about its axis in a clockwise direction. As the block 12 rotates in a clockwise direction, the pin 22 attached to the block 12 will rotate left about the same axis. Similarly, if the tab 24 of the pin 22 is inserted into the slot 54, the tab rotates the slot of the sensor 28, which generates an electrical signal transmitted to a controller by the cable 29. Thus, a controller receiving the signal will be able to determine the position of the bar 18 as it moves to the left. Finally, in the example system 10 seen in FIG. 1, the movable bar 18 has a looped end 48 secured in the open area 30 of the block 12 with a pin 20 passing through the bores 32 of the block and the looped end. This configuration accommodates any vertical movement of the movable bar as the bar moves to the side.

Figure 2A:
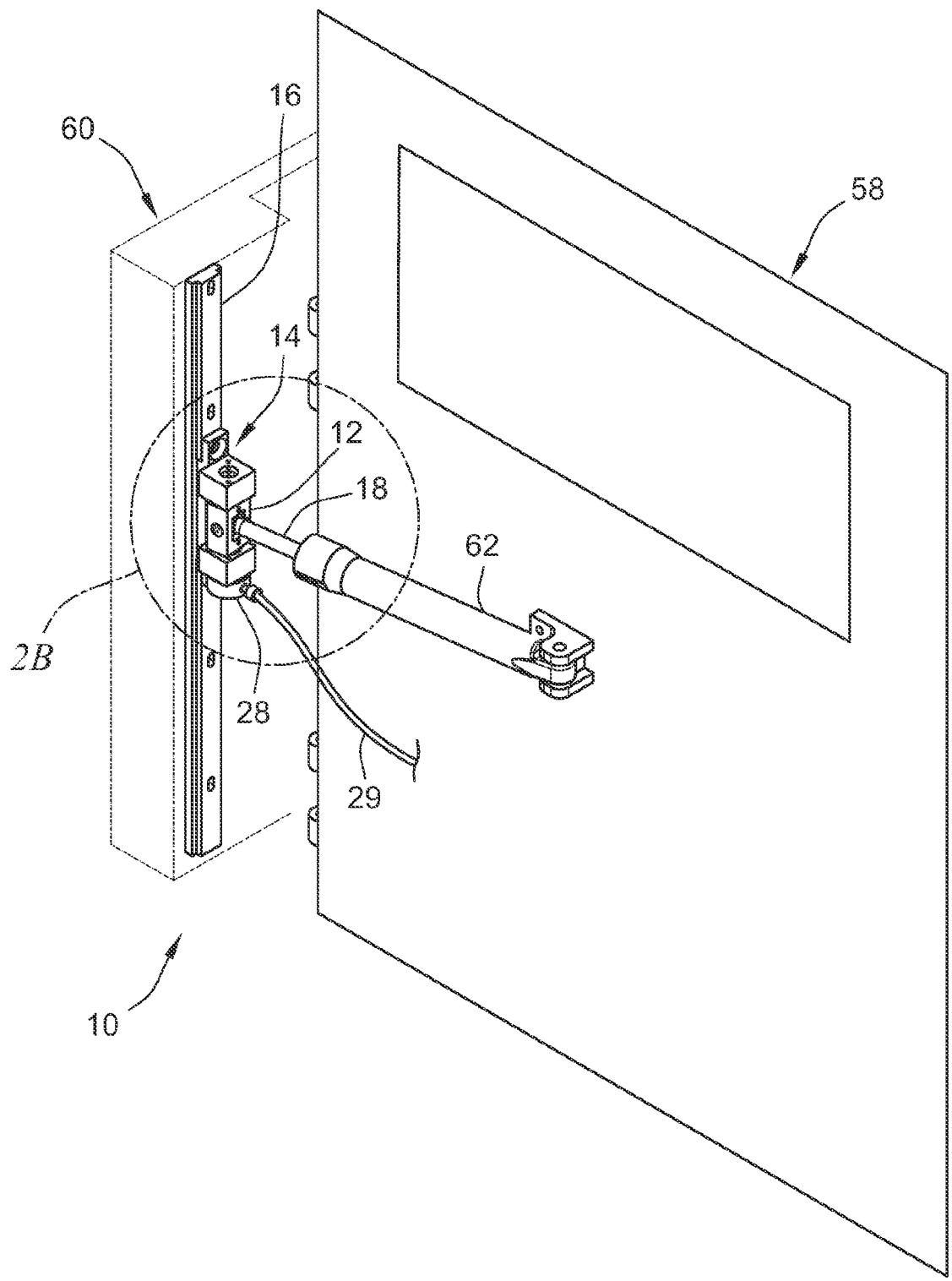
FIG. 2A is a perspective view of an example system for sensing the position of a movable bar installed on a closed vehicle door.
Figure 2B:
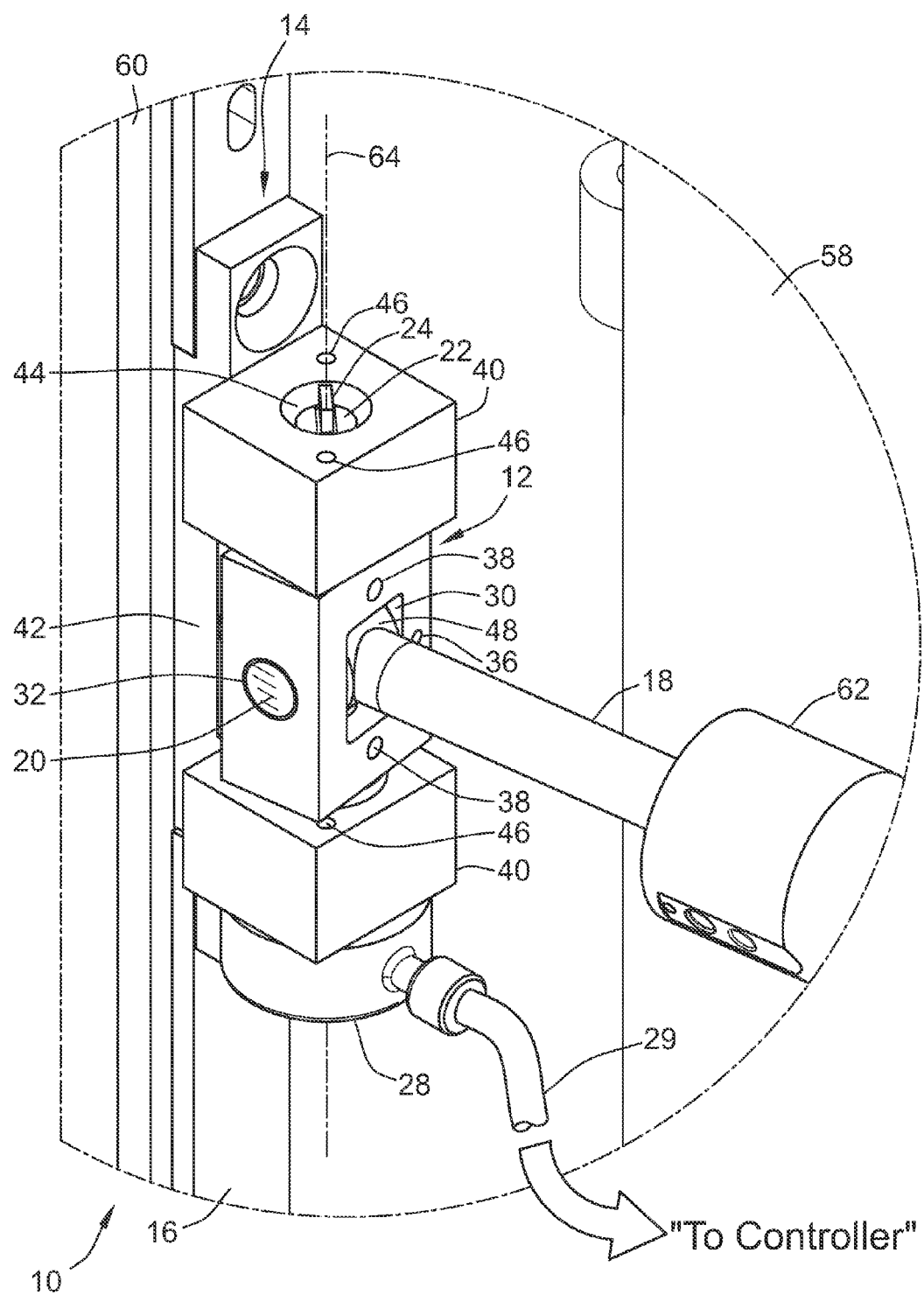
FIG. 2B is a magnified view of section 2B in the example system shown in FIG. 2A installed on a closed vehicle door.
Figure 2C:
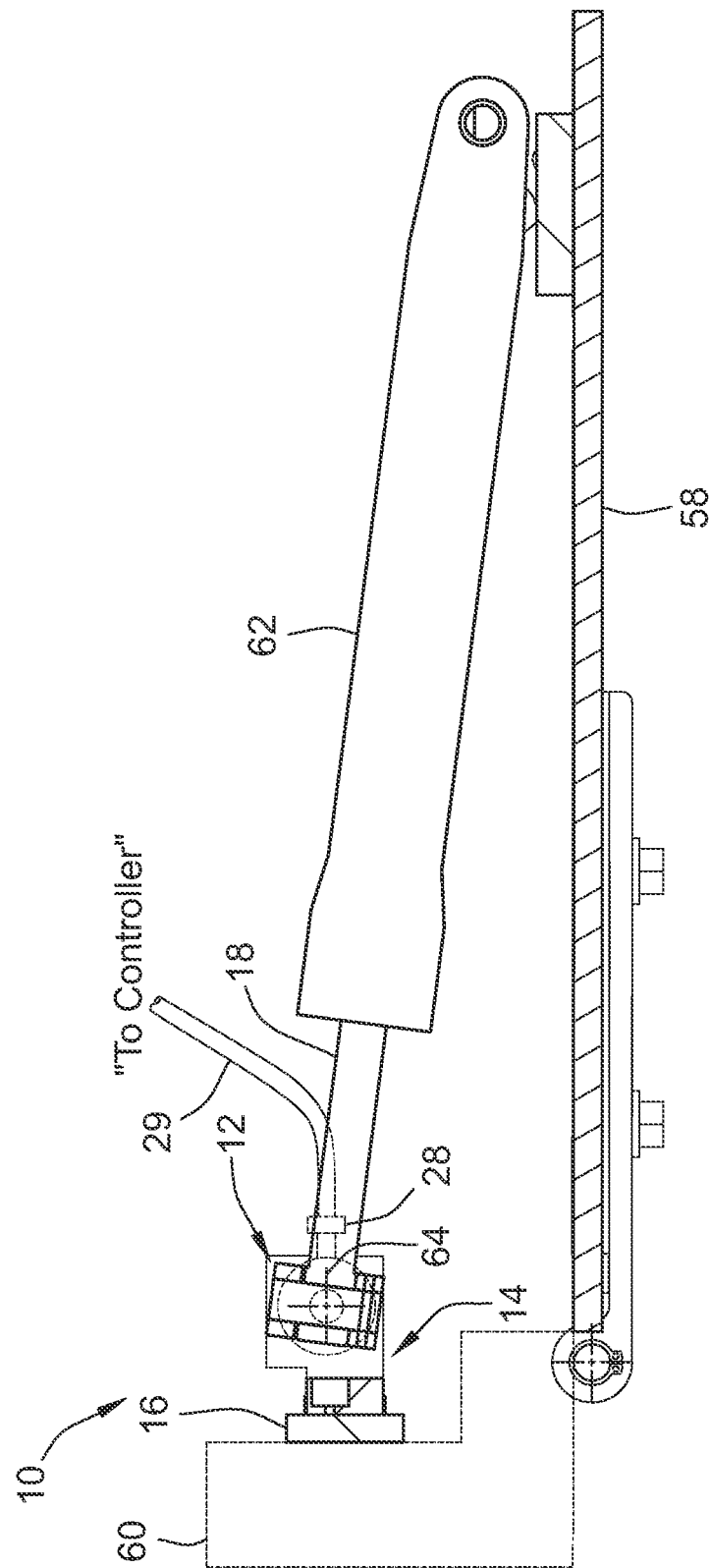
FIG. 2C is a bottom-up view of the example system shown in FIG. 2A installed on a closed vehicle door.

Now referring to FIGS. 2A-2C, an example system 10 for sensing the position of a moveable bar is shown installed on a closed vehicle door 58. In the example seen in FIGS. 2A-2C, the system 10 includes the same components of the example system shown in FIG. 1.

As seen in FIG. 2A, system 10 is shown in a perspective view installed on a vehicle cabin frame 60 where the vehicle door 58 is in a closed position. The mounting bracket 14 is secured to the frame 16, and the frame is secured within the vehicle cabin frame 60. The movable bar 18, in this example, may be a piston of a hydraulic cylinder 62 and is secured in the open area 30 (FIG. 2B) of the block 12. The hydraulic cylinder 62 is attached to the vehicle door 58, and thus moves with the door 58 as the door opens and closes. Further, the piston 18 will move in and out of the cylinder and rotate about the axis of the block 12 as the door opens and closes. As the piston 18 rotates about the axis of rotation, it will similarly cause the block to rotate about its axis, thus rotating the pins 22 (FIG. 2B) and the slot of the sensor 28.

A magnified view of the system 10 installed on a closed vehicle door 58 is shown in FIG. 2B. This view shows the position of the block 12, pin 22, tab 24 and piston 18 when the vehicle door is closed. As seen in FIG. 2B, when the vehicle door 58 is in the closed position, the block 12 rests at a slight initial angle of rotation about the axis 64. This initial angle of rotation corresponds to an electrical signal generated by the sensor 28 and sent to the controller by the cable 29. Further, the piston 18 has not extended out from the hydraulic cylinder 62.

Additionally, the end of the piston 18, in this example, has a looped portion 48 secured to the block 12 with a pin 20. This looped portion 48 through which the pin 20 is inserted accommodates up or down movement that may occur from the vehicle door 58. Where a vehicle door is particularly heavy, it may sag down as it opens, causing the piston of the hydraulic cylinder to sag down as well. Conversely, when the vehicle door is closed and returns from a sagging position, the piston may move upward as it also returns from a sagging position. Thus, the looped portion accommodates this vertical movement reducing strain that may be placed on the block due to sagging of the door.

In FIG. 2C, a bottom-up view shows system 10 installed on a cabin vehicle frame 60 with the vehicle door 58 in a closed position. As seen in the example of FIG. 2C, when the vehicle door 58 is closed, the piston 18 is not extended and the block 12 rests in its slightly rotated initial position about the axis 64. Thus, the controller may interpret the signal generated by the sensor 28 as indicating the vehicle door is in a closed position.

Figure 3A:
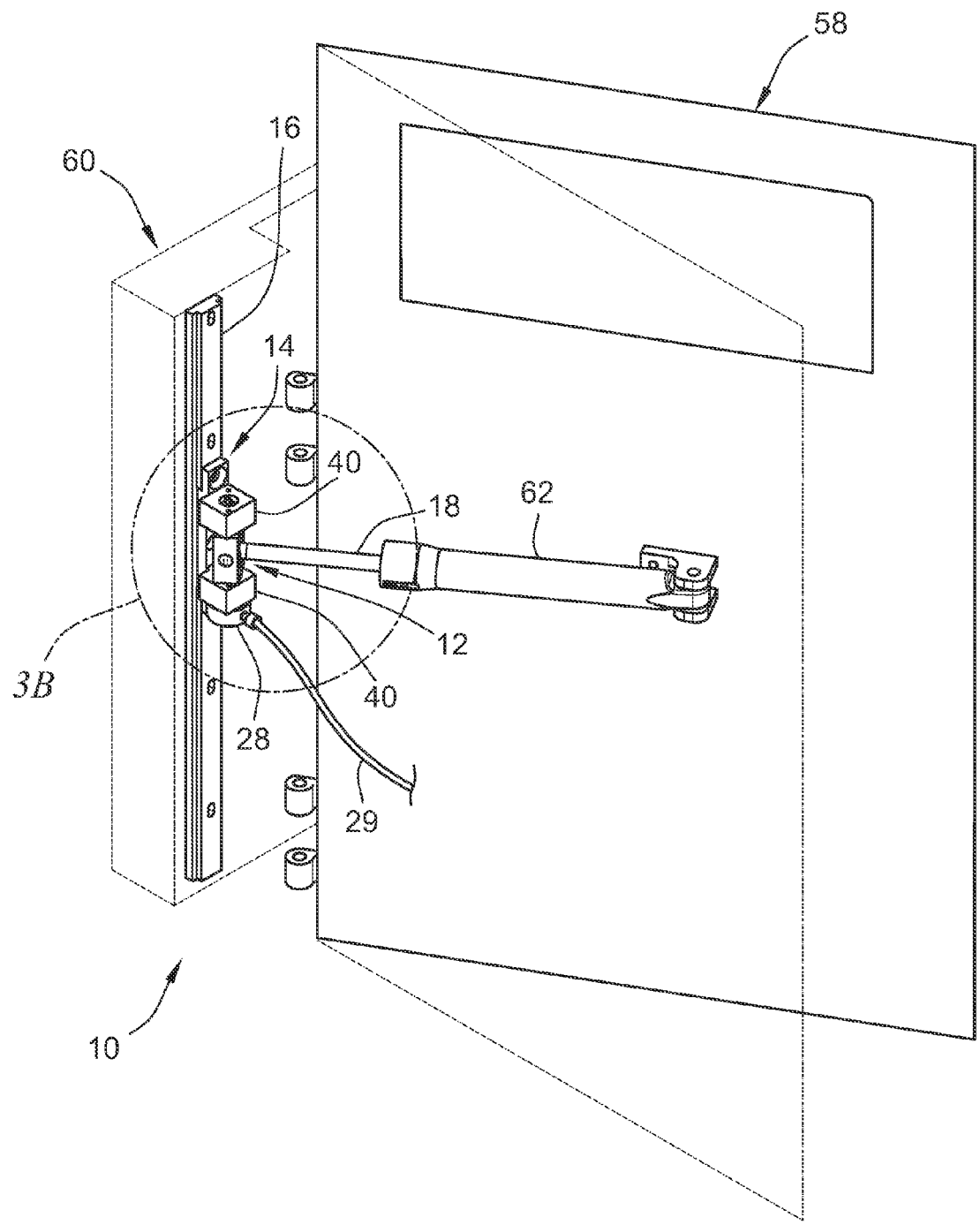
FIG. 3A is a perspective view of an example system for sensing the position of a movable bar installed on a partially open vehicle door.
Figure 3B:
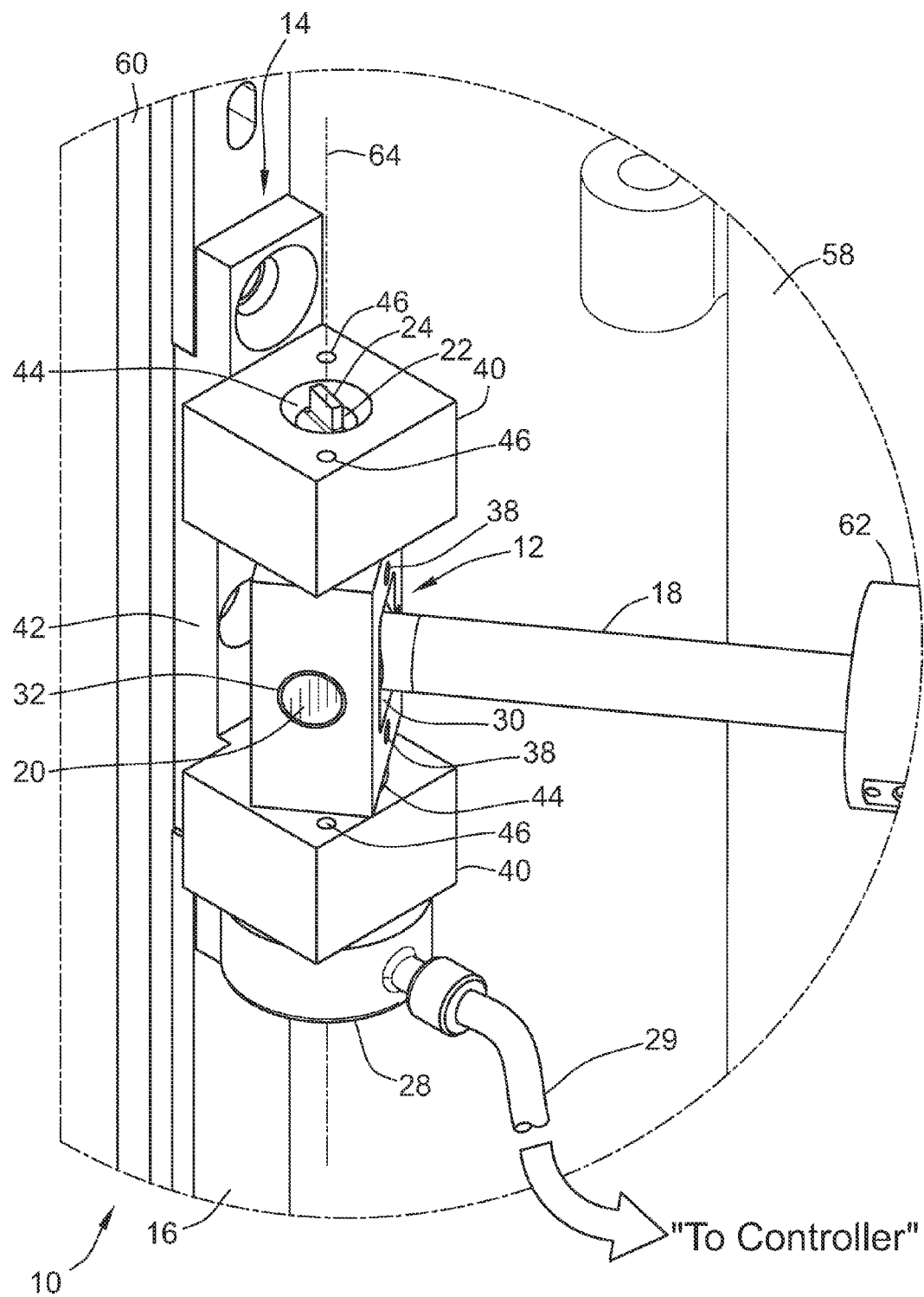
FIG. 3B is a magnified view of section 3B in the example system shown in FIG. 3A installed on a partially open vehicle door.
Figure 3C:
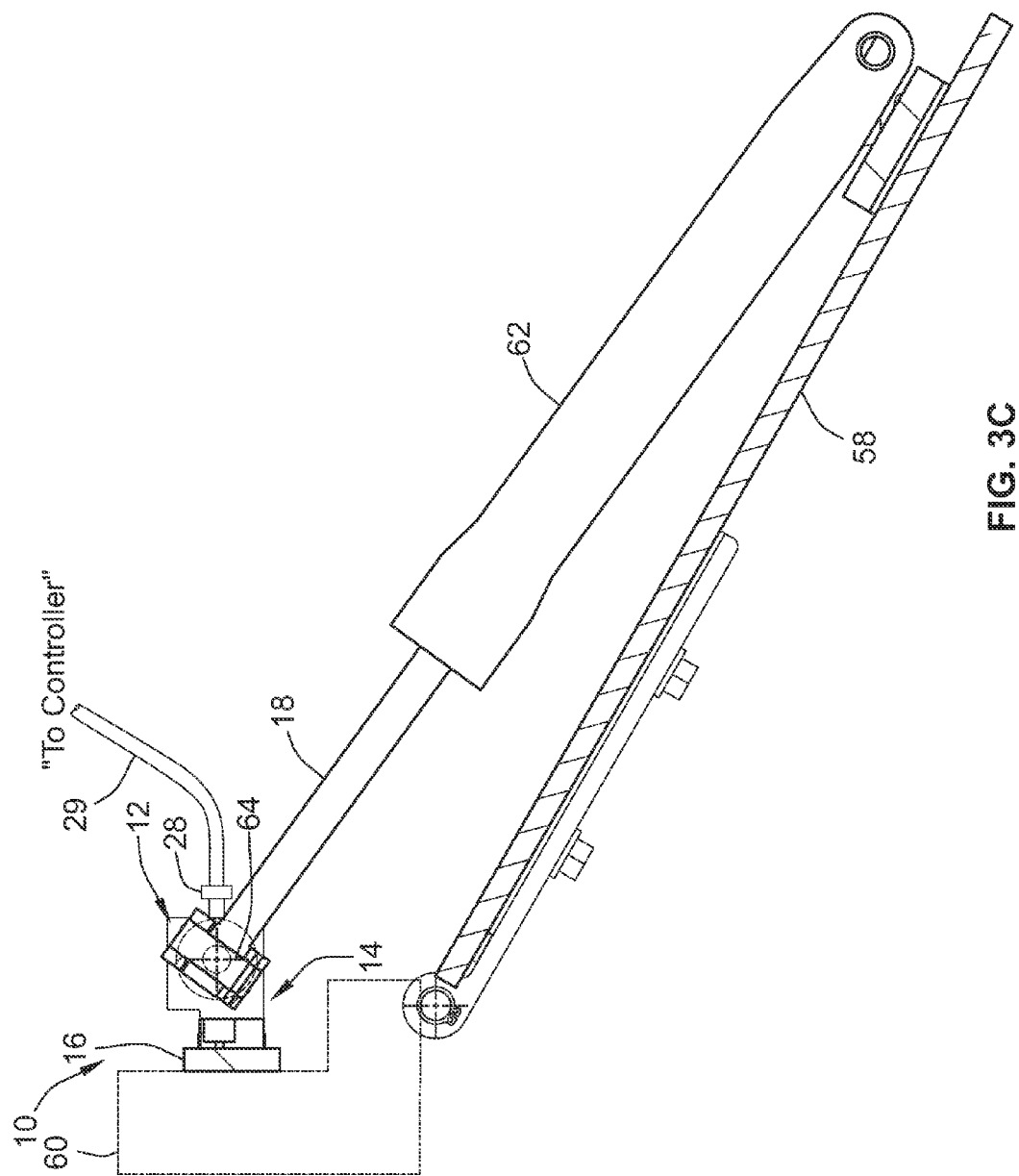
FIG. 3C is a bottom-up view of the example system shown in FIG. 3A installed on a partially open vehicle door.

Referring now to FIGS. 3A-3C, the example system of FIGS. 2A-2C is shown installed on a partially open vehicle door. As seen in the example system of FIG. 3A, system 10 is shown in a perspective view installed on a vehicle cabin frame 60 where the vehicle door 58 is in a partially open position. In FIG. 3A, the vehicle door 58 has moved from a closed position to a partially open position. The piston 18 has extended out from the hydraulic cylinder 62. The piston 18 also moves back towards an open position with the vehicle door 58 rotating the block 12 in a counter-clockwise direction.

As seen in the example of FIG. 3B, a magnified view of system 10 shows the position of the block 12, pin 22, and tab 24 when the vehicle door 58 is partially open. The movement of the vehicle door 58 towards an open position has extended the piston 18 from the hydraulic cylinder 62. As the piston 18 moves towards an open position, it rotates the block 12 counter-clockwise about the axis 64. The rotation of the block 12 has also caused the pin 22 and tab 24 of the pin to rotate about the same axis 64. The corresponding pin and tab, to which the sensor 28 is mated, similarly rotate about the axis 64. The rotation of the corresponding tab 24 has similarly rotated the slot 54 (FIG. 1) of the sensor 28. The rotation of the slot 54 modifies the electrical signal generated by the sensor 28 and sent to the controller by the cable 29.

In FIG. 3C, a bottom-up view shows the example system 10 installed on a cabin vehicle frame 60 with the vehicle door 58 in a partially open position. The block 12 is partially rotated about axis 64. The electrical signal generated by the sensor 28 relates to the angle of rotation of the block 12 about the axis 64, and this electrical signal differs from the electrical signal generated when the vehicle door 58 is in a closed position. The modified electrical signal may be transmitted along the cable 29 to a controller, which may interpret the modified electrical signal as the modified position of the door. In particular, the controller interprets the modified signal as indicating the door is in a partially open position and the extent to which it is open.

Figure 4A:
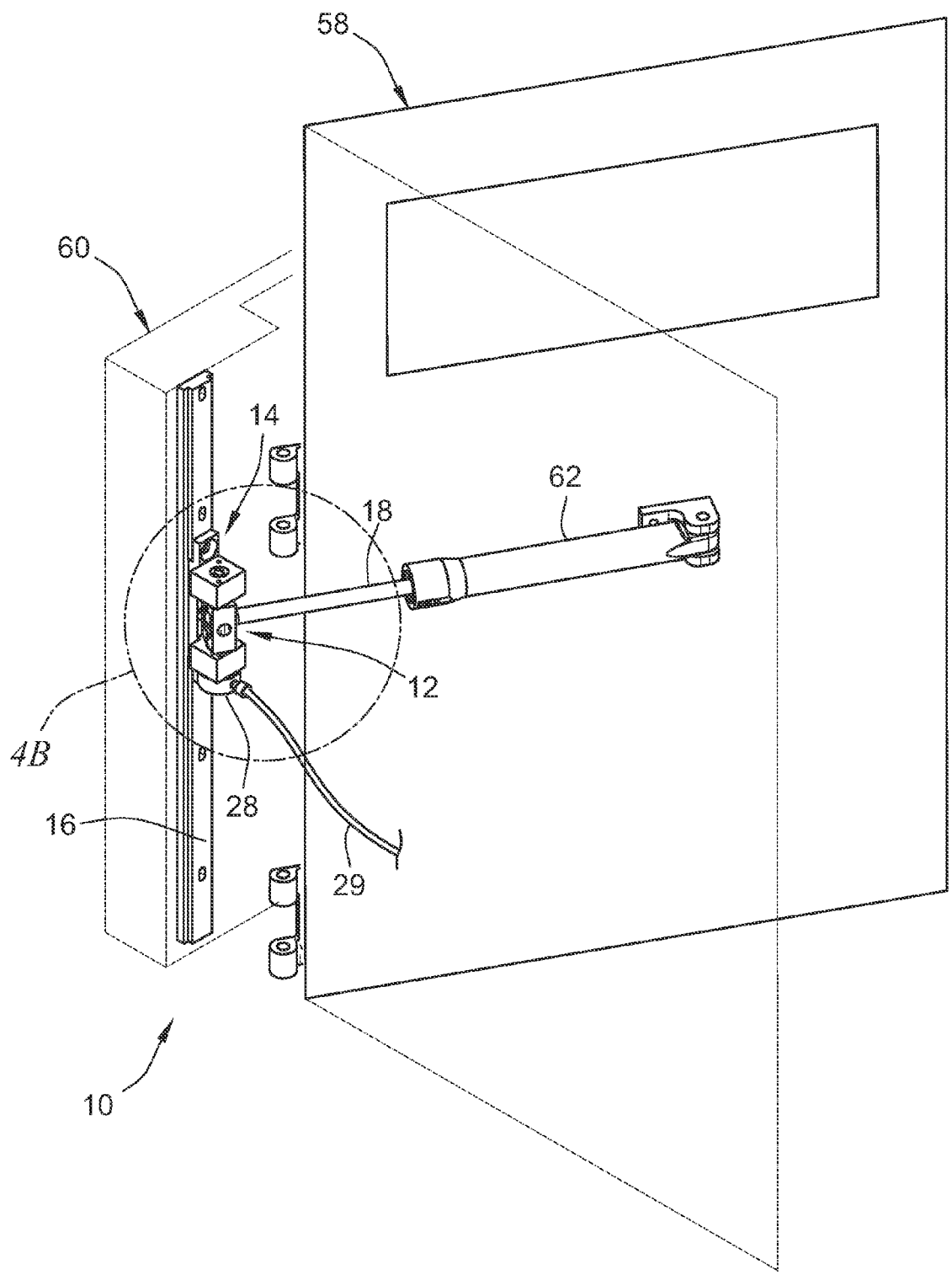
FIG. 4A is a perspective view of an example system for sensing the position of a movable bar installed on a fully open vehicle door.
Figure 4B:
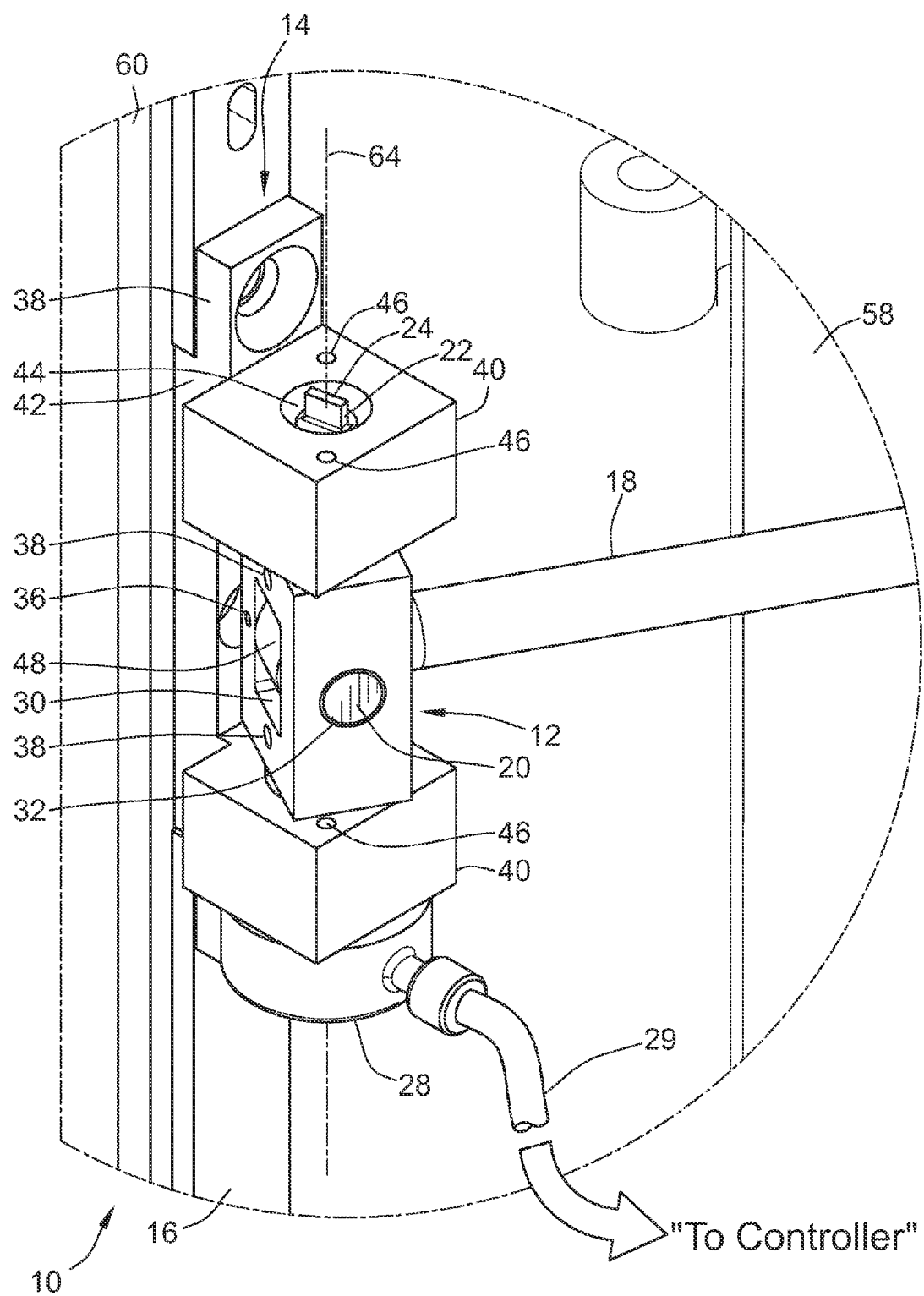
FIG. 4B is a magnified view of section 4B in the example system shown in FIG. 4A installed on a fully open vehicle door.
Figure 4C:
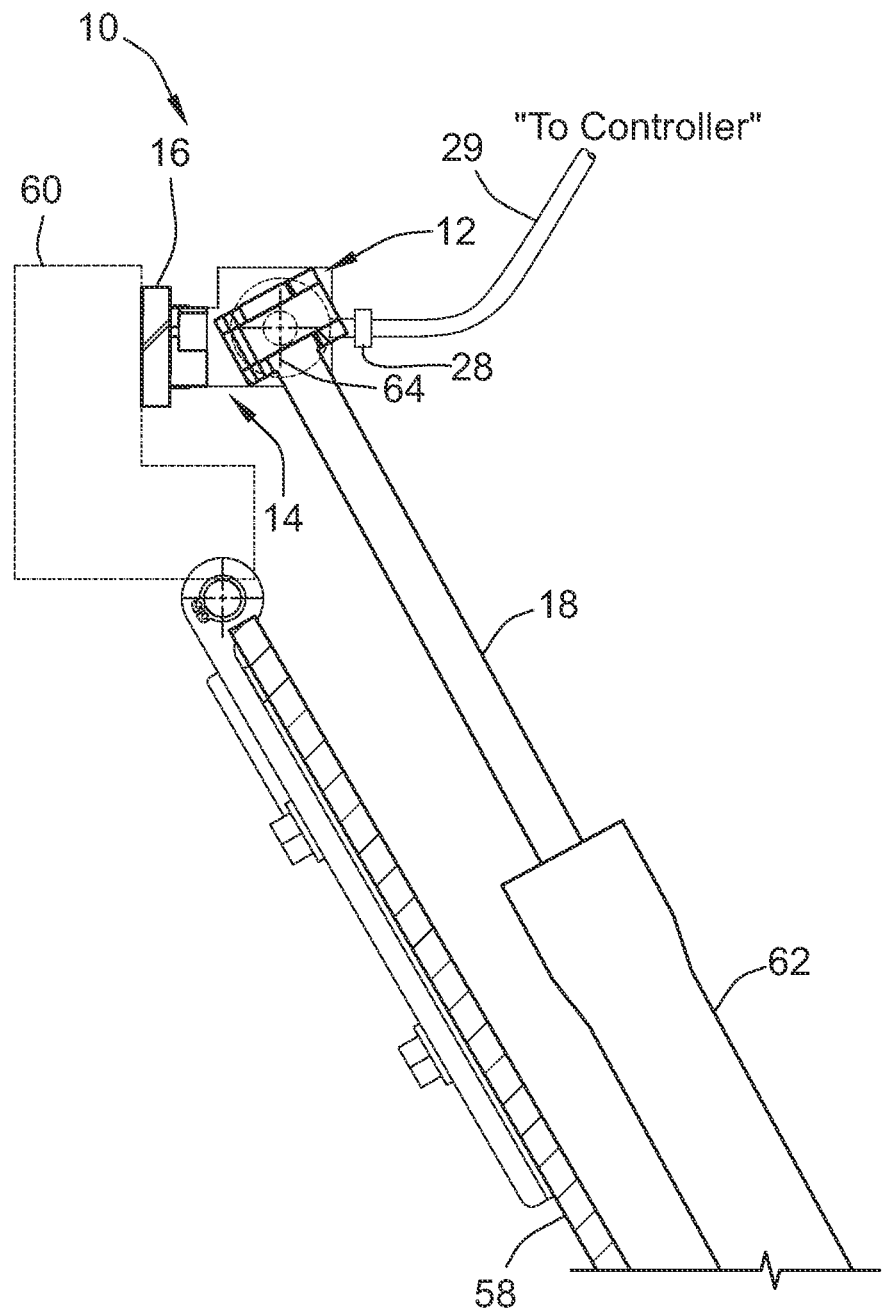
FIG. 4C is a bottom-up view of the example system shown in FIG. 4A installed on a fully open vehicle door.

Finally, referring now to FIGS. 4A-4C, the system seen in FIGS. 3A-3C is now illustrated in a fully open vehicle door position. As seen in the example of FIG. 4A, system 10 is shown in a perspective view installed on a vehicle cabin frame 60 where the vehicle door 58 is in a fully open position. In FIG. 4A, the vehicle door 58 has moved from the partially open position seen in FIGS. 3A-3C to a fully open position. The piston 18 has extended farther out from the hydraulic cylinder 62 and has moved farther back to the open door position with the vehicle door. The piston 18 has also further rotated the block 12 in a further counter-clockwise direction.

As seen in FIG. 4B, a magnified view of the example system 10 shows the position of the block 12, pin 22, and tab 24 when the vehicle door 58 is fully open. The movement of the vehicle door 58 farther to the fully open position has pulled the piston 18 farther to the fully open position as well as causing the block 18 to further rotate about its axis 64. This further rotation of the block 18 has also caused the pin 22 and tab 24 of the pin to further rotate about the same axis 64. The corresponding pin and tab, which the sensor 28 engages, similarly further rotate about the axis 64. This further rotation of the corresponding tab 24 has similarly further rotated the slot 54 (FIG. 1) of the sensor 28. This further rotation of the slot 54 again modifies the electrical signal generated by the sensor 28 and sent to the controller by the cable 29.

In FIG. 4C, a bottom-up view shows the example system 10 installed on a cabin vehicle frame 60 with the vehicle door 58 in a fully open position. The piston 18 has extended farther out from the hydraulic cylinder 62, and the block 12 has further rotated about its axis 64. The electrical signal generated by the sensor 28 relates to the modified angle of rotation of the block 12 about the axis 64, and this electrical signal once again differs from the electrical signal generated when the vehicle door 58 is in a partially open position. The cable 29 carries this additionally modified electrical signal to a controller, which may interpret this signal as an additionally modified position of the door. In particular, the controller may interpret the additionally modified signal as indicating the door is in a fully open position.

The electrical signal generated by the sensor 28 is similarly modified by the rotation of the block 12 as the vehicle door 58 closes. As the vehicle door 58 moves from a fully open position to a partially open position, the piston 18 retracts into the hydraulic cylinder 62 and rotates the block 12 in the opposite direction as the vehicle door and piston move. The pins attached to the block 12 and the slot of the sensor 28 similarly rotate in the opposite direction as the piston 18 rotates the block. As the slot of the sensor 28 rotates, the sensor generates an electrical signal relating to the rotation of the block 12, which the controller may interpret as the position of the piston 18 and thus the position of the vehicle door 58.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that a certain of the details described herein can be varied considerably without departing from the basic principles of the invention.

What is claimed is:

1. A system for sensing the position of a movable bar, comprising:
   a rotatable body that is positioned for rotation about an axis, the rotatable body being mechanically coupled with the movable bar such that the rotatable body rotates about the axis as the movable bar moves, and wherein the moveable bar is a piston of a hydraulic cylinder; and
   a sensor mechanically coupled with the rotatable body such that the sensor senses the rotation of the rotatable body as the piston of the hydraulic cylinder moves.

2. The system of claim 1 further comprising a mounting bracket that holds the rotatable body to permit rotational movement of the rotatable body.

3. The system of claim 2 wherein the mounting bracket is secured to a frame member, the frame member configured to be attached within a vehicle cabin.

4. The system of claim 2 wherein the mounting bracket comprises a clevis-shaped bracket having a pair of support members extending from a base, the rotatable body is held between the pair of support members and is spaced apart from the base.

5. The system of claim 2 wherein the rotatable body has an open area for receipt of at least a portion of the piston of the hydraulic cylinder.

6. The system of claim 5 wherein an end of the piston is positioned in the open area of the rotatable body.

7. The system of claim 2 wherein the hydraulic cylinder is installed within a vehicle door such that movement of the vehicle door moves the piston causing the rotatable body to rotate, the sensor is adapted to send an electrical signal to a controller wherein the electrical signal relates to the position of the vehicle door.

8. A system for sensing the position of a movable bar comprising:
   a rotatable body that is positioned for rotation about an axis, the rotatable body being mechanically coupled with the movable bar such that the rotatable body rotates about the axis as the movable bar moves;
   a mounting bracket that holds the rotatable body to permit rotational movement of the rotatable body, wherein the rotatable body has an open area and an end of the moveable bar is positioned in the open area of the rotatable body, and wherein the rotatable body further comprises a block and a securing piece is positioned through the open area of the block, the securing piece engages the movable bar in the open area of the block; and
   a sensor mechanically coupled with the rotatable body such that the sensor senses the rotation of the rotatable body as the movable bar moves.

9. The system of claim 8 wherein the end of the movable bar is held by the securing piece within the open area of the block.

10. The system of claim 9 wherein the movable bar has a looped portion, the securing piece is inserted through the looped portion of the movable bar with the securing piece extending through the open area of the block.

11. A system for sensing the position of a movable bar, comprising:
    a rotatable body that is positioned for rotation about an axis, the rotatable body being mechanically coupled with the movable bar such that the rotatable body rotates about the axis as the movable bar moves;
    a mounting bracket that holds the rotatable body to permit rotational movement of the rotatable body; wherein the rotatable body has an open area for receipt of at least a portion of the movable bar, and at least one pin is mechanically coupled with the rotatable body and rotates as the moveable bar moves; and
    a sensor mechanically coupled with the rotatable body such that the sensor senses the rotation of the rotatable body as the movable bar moves.

12. The system of claim 11 wherein at least a portion of the pin is held by the rotatable body such that the pin rotates about the same axis of rotation as the rotatable body.

13. The system of claim 12 wherein the pin has a tab which engages a corresponding slot of the sensor such that the tab of the pin and the slot of the sensor rotate as the rotatable body rotates.

14. The system of claim 13 wherein the sensor transmits a signal to a controller as the rotatable body and pin rotate, the signal being proportional to the position of the movable bar.

15. The system of claim 11 wherein the sensor is positioned for alignment along the same axis of rotation that the rotatable body and the pin rotate about.

16. The system of claim 11 wherein the rotatable body further comprises a block and the pin is held in a bore at a sidewall of the block.

17. The system of claim 16 wherein the mounting bracket comprises at least one support member extending from a base, the support member of the mounting bracket has a bore for receipt of the pin and wherein the bore of the block is aligned with the bore of the support member such that at least a portion of the pin is held by the bore of the support member and the bore of the block.

18. The system of claim 16 wherein the pin has a hole which aligns with a corresponding hole of the block such that aligning the hole of the pin with the hole of the block sets the tab of the pin at a pre-determined position.

19. A system for sensing the position of a movable bar, comprising:
    a rotatable body that is positioned for rotation about an axis, the rotatable body being mechanically coupled with the moveable bar such that the rotatable bar rotates about the axis as the moveable bar moves;
    a mounting bracket that holds the rotatable body to permit rotational movement of the rotatable body, wherein the mounting bracket further comprises a pair of support members, each support member having a bore alignable with a corresponding bore at opposite side walls of the rotatable body, and wherein a pair of pins are individually positioned through the pair of bores of the support members to the corresponding bores of the rotatable body; and
    a sensor mechanically coupled with the rotatable body such that the sensor senses the rotation of the rotatable body as the movable bar moves.

* * * * *